(12) United States Patent
Neal et al.

(10) Patent No.: US 7,374,008 B1
(45) Date of Patent: May 20, 2008

(54) HOOD ELEVATION SYSTEM

(75) Inventors: Mark O. Neal, Rochester, MI (US); Mark A. Kramarczyk, Sterling Heights, MI (US); Dorel M. Sala, Troy, MI (US); Jenne-Tai Wang, Rochester, MI (US); Heath Knight-Newbury, Salt Lake City, UT (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/745,591

(22) Filed: May 8, 2007

(51) Int. Cl.
*B60K 28/10* (2006.01)
(52) U.S. Cl. .................................................. 180/274
(58) Field of Classification Search ............. 180/274, 180/271; 296/187.03, 187.04, 193.11
See application file for complete search history.

(56) References Cited

U.S. PATENT DOCUMENTS

| | | | |
|---|---|---|---|
| 3,791,476 A | * | 2/1974 | Wernig .................. 280/753 |
| 5,967,573 A | | 10/1999 | Wang |
| 6,302,458 B1 | | 10/2001 | Wang et al. |
| 6,401,565 B1 | | 6/2002 | Wang et al. |
| 6,415,882 B1 | | 7/2002 | Schuster et al. |
| 6,439,330 B1 | | 8/2002 | Paye |
| 6,513,617 B2 | | 2/2003 | Sasaki et al. |
| 6,571,901 B2 | * | 6/2003 | Lee ......................... 180/274 |
| 6,641,166 B2 | | 11/2003 | Browne et al. |
| 6,813,562 B2 | | 11/2004 | Altan et al. |
| 2005/0264036 A1 | * | 12/2005 | Kramarczyk et al. .. 296/187.03 |

* cited by examiner

*Primary Examiner*—Faye M. Fleming (57) ABSTRACT

A hood elevation system for a vehicle includes an actuator configured to selectively move at least a portion of a vehicle hood between an elevated and a retracted position. The hood elevation system also includes a motor and a spring. The spring biases the hood toward its elevated position, and the motor is configured to retract the hood, thereby compressing the spring.

11 Claims, 6 Drawing Sheets

HOOD ELEVATION SYSTEM

TECHNICAL FIELD

This invention relates to vehicles having a hood operatively connected to a motor and a spring for selectively elevating the hood.

BACKGROUND OF THE INVENTION

In certain vehicle impact situations, an object may exert a downward force on the vehicle hood. Deformation of the vehicle hood as a result of the downward force provides impact energy absorption However, the deformation and, correspondingly, the hood's ability to absorb energy, may be impeded by the hood's proximity to components in the engine compartment. Accordingly, clearance between a vehicle hood and engine compartment components facilitates deformation of the hood, or another energy absorbing material operatively connected to the hood, when the hood is acted on with a downward force.

However, minimal clearance between the hood and the engine compartment components may provide significant benefits such as improved driver visibility and aerodynamics.

SUMMARY OF THE INVENTION

A vehicle with a hood elevation system is provided. The vehicle includes a hood and a hood actuator. The hood is configured to extend above and over a front compartment and is selectively movable between an elevated position and a lowered position. The hood actuator is configured to selectively move the hood between its lowered and elevated positions. The hood actuator includes a spring and a motor. The spring biases the hood toward its elevated position when the hood is in its lowered position. The motor is operatively connected to the hood and configured to selectively cause the hood to move from its elevated position to its lowered position and thereby compress the spring.

The spring may elevate the hood without the assistance of the motor or the spring and the motor may cooperate to exert force on the hood to elevate it. Accordingly, the hood actuator enables the use of a smaller motor, with attendant mass and cost savings. The hood is also easily retractable in the event that the hood is elevated by the actuator but no impact occurs; the motor causes the hood to move to its lowered position and recompresses the spring so that the actuator is ready to move the hood to its elevated position.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
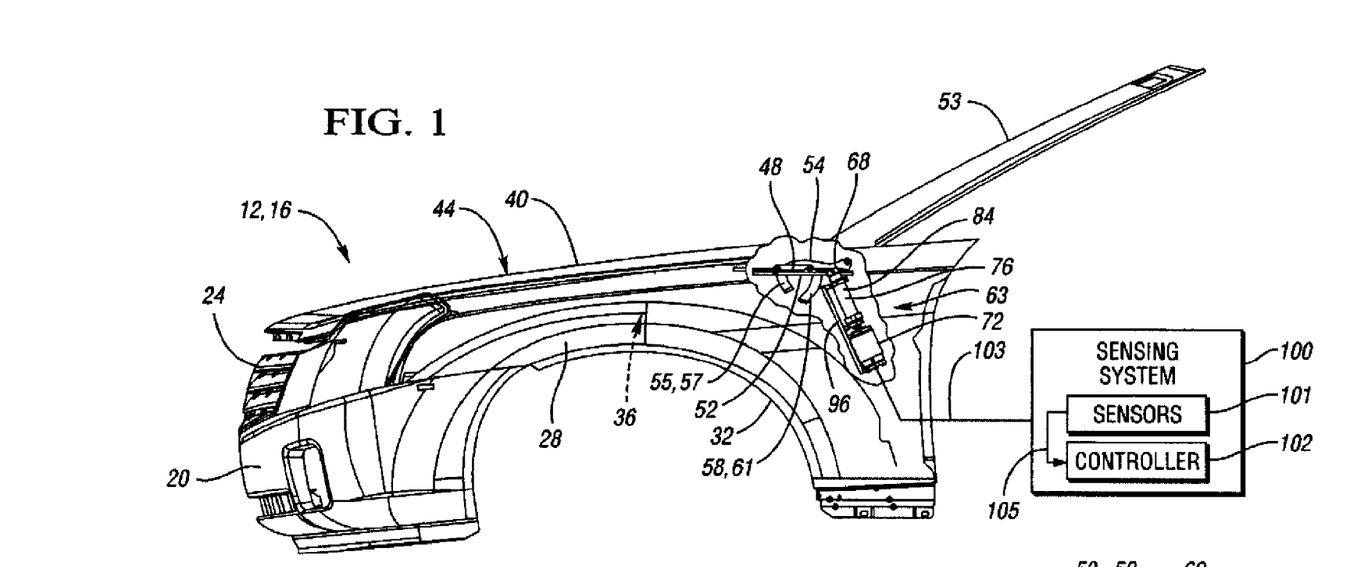
FIG. 1 is a partial cutaway schematic side view of a front portion of a vehicle including a hood actuator system and a hood in a lowered position.

Referring to FIG. 1; the front portion 12 of a vehicle 16 is schematically depicted. The front face of the vehicle is formed by a front bumper 20 and a grille 24. A fender 28 partially defines a wheel opening 32 and a front compartment 36, which, in the embodiment depicted, is an engine compartment. The front compartment 36 contains various vehicular components (not shown) such as an engine; battery; steering components; braking components; and heating, ventilation, and air conditioning components. A hood 40 defines a portion of the upper surface 44 of the vehicle 16, and is configured to pivot about a set of hinges 48. The hinges 48 are mounted to an upper rail 52 adjacent to a cowl (not shown). A windshield 53 extends upward and rearward of the hood 40.

Figure 2:
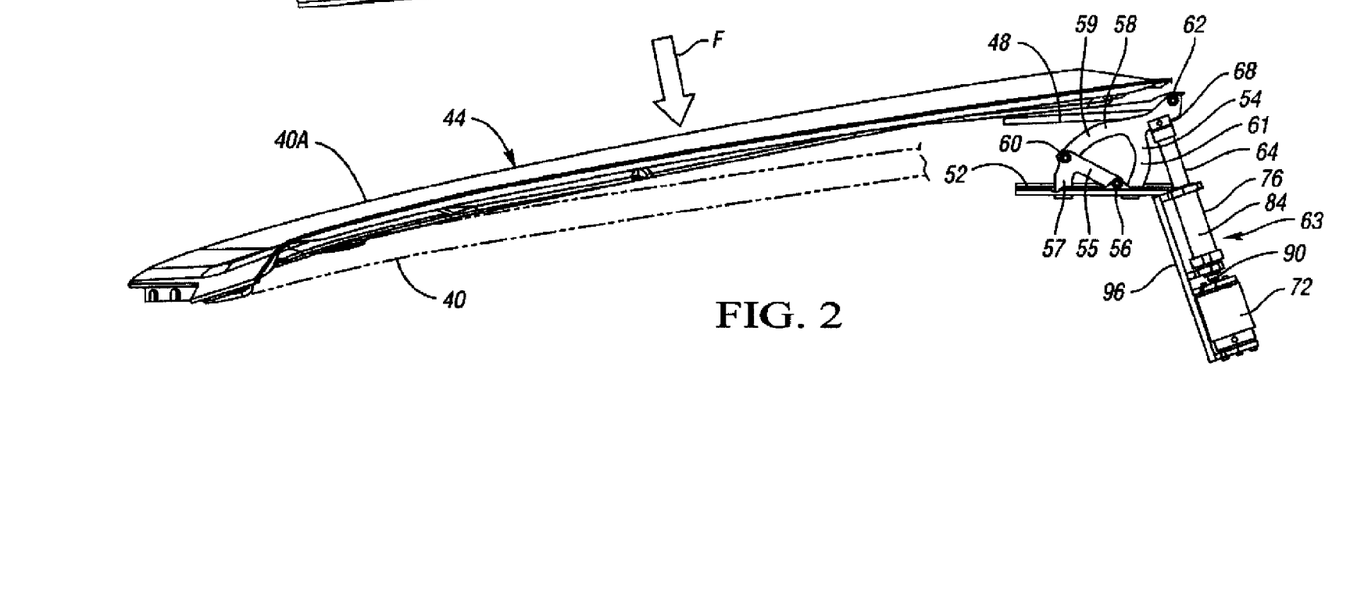
FIG. 2 is a schematic side view of the hood actuator system and hood of FIG. 1 with the hood in an elevated position.

The hinges 48 are each operatively connected to a hood deployment linkage 54. Referring to FIGS. 1 and 2, the hood deployment linkage 54 includes a first link 55 pivotably connected with respect to the upper rail 52 at pivotable connection 56. The first link 55 includes an arm 57 extending through a first aperture (not shown) formed in the upper rail 52. A second link 58 includes arm 59 pivotably connected to the first link 55 at pivotable connection 60, and arm 61 extending through a second aperture (not shown) formed in the upper rail 52. The first and second apertures guide arms 57 and 61, respectively, during movement of the links. Hinge 48 is pivotably connected to the second link 58 at pivotable connection 62. The hood deployment linkage 54 is configured to permit conventional hood opening to access the engine, for example, whereby the hood 40 is lifted at its forward end adjacent the grille 24 and pivoted about the hinges 48 adjacent its rearward end. The hood deployment linkage 54 is also configured to permit the hood 40 to be elevated whereby the hood is lifted adjacent its rearward end while the forward end remains lowered, as explained in further detail below. Those skilled in the art will recognize other hinge and linkage configurations that may be employed within the scope of the claimed invention.

The hood 40 is operatively connected to a reversible hood actuator system 63. The reversible hood actuator system 63 is configured to selectively move the hood 40 between a retracted, or lowered, position, as depicted in FIG. 1, and an extended, or elevated, position, as shown at 40A in FIG. 2. More specifically, the hood actuator system 63 includes a member 64 (also referred to herein as "inner tube") that is operatively connected to the hood 40 via the hood deployment linkage 54 and a bracket 68, which may or may not be an integral part of member 64. Bracket 68 is pivotably connected to the hood deployment linkage 54. The member 64 is operatively connected to an electric motor 72 via a self-locking mechanism 76. The motor 72 is operative to selectively cause the member 64 to move between a retracted position, as shown in FIG. 1, and an extended position, as shown in FIG. 2. In the embodiment depicted, member 64 is substantially entirely disposed within a tube 84 in its retracted position, and extends outward from the tube 84 in its extended position. Movement of the member 64 between its extended and retracted positions causes the hood 40 to move between its lowered and elevated positions due to the connection of the member 64 to the hood 40, and accordingly the motor 72 is operative to cause the hood 40 to move between its elevated and lowered positions.

More specifically, when member 64 is being extended, it acts on the hood deployment linkage 54 to cause the rearward end of the hood 40 to rise while the forward end of the hood pivots about one or more latches and strikers (not shown). Referring specifically to FIG. 2, the height of the hood relative to the engine compartment in the retracted position, shown in phantom at 40, is less than the height of the hood in the elevated position, shown at 40A. The self-locking mechanism 76 is sufficiently operatively connected to the member 64 to resist downward movement of the member 64 and, correspondingly, the hood 40, caused by an external force F having a vertical component applied to the hood during a vehicle impact; the self-locking mechanism 76 allows downward movement of the member 64, and correspondingly, the hood 40, initiated by the motor 72.

Figure 3:
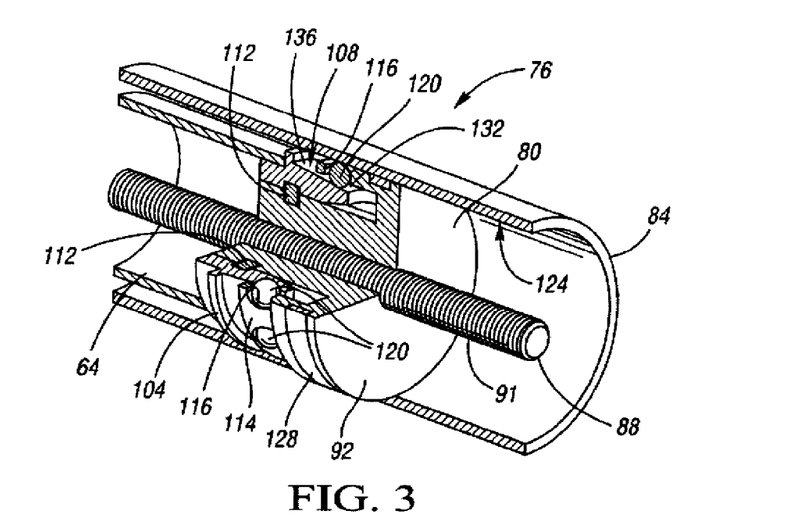
FIG. 3 is a schematic, partially cut-away, perspective view of a self locking mechanism that is part of the hood actuator system of FIGS. 1-2.
Figure 4:
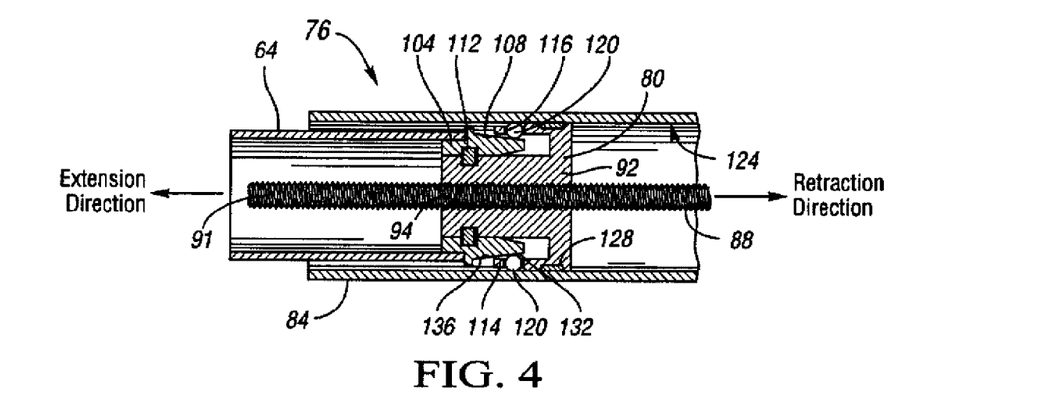
FIG. 4 is a schematic cross-sectional view of the self locking mechanism of FIG. 3 in a first mode.
Figure 5:
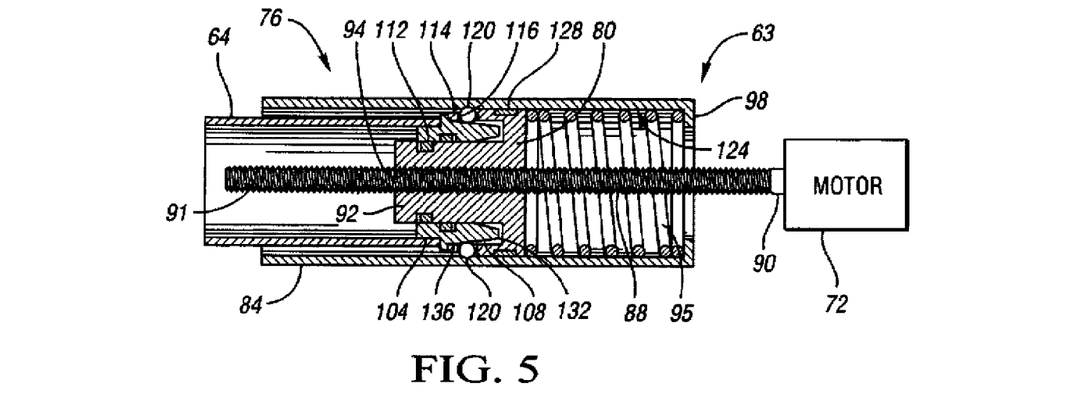
FIG. 5 is a schematic cross-sectional view of the self-locking mechanism of FIG. 4 in a second mode.

Motor 72 is preferably a direct drive motor that is coaxially aligned with the self-locking mechanism 76 to minimize the required packaging space. Referring specifically to FIGS. 3-5, the self-locking mechanism 76 includes a shuttle 80 located inside an outer tube 84 for translation therein. A shaft, such as lead screw 88, is connected to the output shaft 90 of the motor 72 to receive torque therefrom. The lead screw 88 is characterized by self-locking threads 91. The shuttle 80 includes a nut 92, which is characterized by threads 94. The self-locking threads 91 of the lead screw 88 are meshingly engaged with the threads 94 of the nut 92 such that rotation of the lead screw 88 causes translation of the nut 92, and therefore the shuttle 80, in either the extension or retraction directions. That is, rotation of the lead screw 88 in one direction causes the nut 92 to translate in the extension direction, and rotation of the lead screw in the opposite direction causes the nut 92 to translate in the retraction direction. In the embodiment depicted, member 64 is an inner tube connected to the shuttle 80 for translation therewith.

The hood actuator system 63 also includes a spring (shown at 95 in FIG. 5) disposed between the shuttle 80 and the end 98 of the tube 84 proximate to the motor 72. The spring 95 biases the shuttle 80, and therefore the member 64, in the extension direction. Accordingly, the spring 95 also biases the hood 40 into its elevated position. However, the self-locking threads 91 of the lead screw 88 prevent movement of the shuttle 80 and the member 64 in the extension and retraction directions without rotation of the lead screw 88 caused by the motor 72.

Referring again to FIG. 1, the motor 72 and the self-locking device 76 are supported and retained by a hood elevation system frame 96, which is mounted to the vehicles upper mid-rail (not shown) in a manner to allow the degrees of freedom that may be required by the hood deployment linkage 54. The motor 72 is controlled by a sensing system 100 (pre-impact or impact initiation) located elsewhere on the vehicle that determines when hood elevation, or "hood deployment," is required.

The sensing system 100 includes sensors 101 and a sensing system controller 102. The sensors 101 monitor the vehicle environment and transmit signals 105 carrying sensor data describing vehicle environmental conditions to the controller. The sensing system controller 102 is programmed to analyze the sensor data from the signals 105 to determine if one or more predetermined vehicle conditions indicative of an elevated risk of vehicle impact exist. The controller includes a data storage medium with stored data that the controller uses to determine the presence or absence of the one or more predetermined conditions based on the sensor data. Those skilled in the art will recognize that the stored data may be in a multitude of forms within the scope of the claimed invention, such as relational databases, look-up tables, formulae, etc. Those skilled in the art will also recognize a variety of sensing system 100 configurations that may be employed within the scope of the claimed invention. For example, sensors 101 may include radar sensors, video sensors, photoelectric sensors, etc. The sensing system may also include radar transmitters (not shown).

The controller 102 is programmed and configured to generate a signal 103 that causes the activation of the motor 72, which in turn causes member 64 to move in an extension direction to move the hood to the elevated position, when the controller determines the existence of the one or more predetermined conditions.

Referring to FIGS. 1-5, under normal usage the hood 40 will remain in the retracted, or lowered, position to optimize vehicle requirements other than energy absorption of the hood. However, when it is determined by the sensing system 100 that the hood 40 should be deployed to the elevated position, the motor 72 is engaged to turn the screw 88, which drives the nut 92 of the self-locking mechanism 76 along the length of the screw 88. The self-locking mechanism 76 extends the inner tube 64, which through its attachment to the hood deployment linkage 54 causes the hood 40 to rise to the elevated position and creates additional under-hood clearance.

After a hood deployment, if the sensing system 100 determines that the possibility of impact has been low in the last "x" seconds (e.g., "x" is equal to 5 seconds), the system operation is reversed to lower the hood 40 from the elevated position to the retracted position. That is, the motor 72 is engaged to turn the screw 88 in the opposite direction from deployment. The nut 92 and shuttle 80 are pulled down by the screw 88 to return the hood deployment linkage 54 and inner tube 64 to the retracted position. Early detection, or pre-impact sensing systems, such as radar, can be used with the hood actuator system 63 since an erroneous deployment can be quickly and automatically reversed. This same early detection sensing system could be used for pre-impact activation of other devices, impact avoidance systems, or even a parking assist system, allowing the cost of the sensing system 100 to be shared among many vehicle features.

Referring specifically to FIG. 2, in the event that while elevated, i.e., deployed, an external load F is brought upon the hood 40 as a result of an impact with an object, the self-locking mechanism 76 operates in one of two modes:

(a) a locking mode in which the self-locking mechanism is configured to lock and prevent downward movement of member 64, and (2) a plastic deformation mode, in which the self-locking mechanism absorbs impact energy. The plastic deformation mode is preferred and reduces the loads placed upon the structural components of the hood deployment system, which should result in decreased cost.

The locking mode provides the option of absorbing the load in a variety of other ways, such as deformation of the hood 40, buckling of the inner tube 64, and deformation of an energy-absorbing component placed in-line with the inner tube 64. Examples of energy-absorbing components include, but are not limited to, resilient members such as compression springs and elastomers, and compliant and healable member such as that of shape memory materials.

Referring again to FIGS. 3-5, sleeve 104 interconnects the member 64 and the nut 92. The sleeve 104 defines a conical surface identified as ramp 108. Sleeve 104 is coupled to the nut 92 by an annular shear element 112. The shuttle 80 includes a retainer 114 that defines a plurality of holes 116 that space and retain roller elements, i.e., balls 120, uniformly around the circumference of the sleeve 104. The roller elements 120 are retained radially between the ramp 108 of sleeve 104 and the inner surface 124 of the outer tube 84. A guide ring 128 supports the nut 92 on the inner surface 124 of the outer tube 84.

The ramp 108 includes a first end 132 and a second end 136. The first end 132 is characterized by a greater distance from the inner surface 124 than the second end 136. The outer tube 84 is connected to the vehicle structure, i.e., via the frame shown at 96 in FIGS. 1 and 2. Part of the retainer 114 extends between the roller elements 120 and the second end 136 of the ramp 108. When the motor 72 rotates the lead screw 88 to translate the nut 92 in the retraction direction, the retainer 114 is also moved in the retraction direction and, in turn, drives the rolling elements in the retraction direction. In a first mode of operation, illustrated in FIGS. 3 and 4, the ramp 108 is connected to the nut 92 and the retainer 114 via the shear element 112 for unitary movement therewith. Thus, the portion of the retainer 114 between the roller elements 120 and the second end 136 of the ramp restricts relative movement between the roller elements 120 and the ramp 108 when the lead screw 88 drives the nut 92 and the sleeve 104 with ramp 108 in the retraction direction. The retainer 114 thereby prevents the roller elements from moving to a segment of the ramp 108 where there is inadequate clearance between the ramp 108 and the inner surface 124. The retainer 114 thus allows the motor 72 to move sleeve 104, member 64, and the hood in the retraction direction through movement of the lead screw 88.

The load capacity of shear element 112 can be tailored to allow the self-locking mechanism 76 to operate in the first mode and a second mode. The self-locking mechanism 76 operates in the first mode when the load transmitted by the hood to the inner tube 64, via the hinges and linkage, is less than the load capacity of the shear element 112. The shear element 112 therefore remains intact, and the sleeve 104 and the shuttle 80 are rigidly interconnected for unitary movement within the outer tube 84.

When an external load is brought upon the hood 40 that is consistent with an impact, the load is transmitted into the self-locking mechanism 76 via the hood and the hood deployment linkage. The inner tube 64 and sleeve 104 will transmit this load into the shear element 112 whose movement is fixed relative to the nut 92. The load being sufficient to overcome the load capacity of the shear element 112 will initiate the second mode of the self-locking mechanism 76. In the second mode, shown in FIG. 5, the shear element 112 will separate into multiple segments, decoupling the inner tube 64 and sleeve 104 from the nut 92 and retainer 114.

As the inner tube 64 and sleeve 104 translate relative to the nut 92, the retainer 114, and the rolling elements 120, the rolling elements 120 will move with respect to the ramp 108 toward the second end 136, where there is inadequate clearance between the ramp 108 and the inner surface 124 to accommodate the rolling elements 120. In other words, the rolling elements 120 will traverse radially due to the load being applied on them by ramp 108 as they move from the first end 132 toward the second end 136. Rolling elements 120 will begin to wedgingly engage the inner surface 124 of the outer tube 84, resisting downward movement of the hood and member 64, either by causing the sleeve 104 and member 64 to lock with respect to the outer tube 84, or by plastically deforming the outer tube 84. In the second mode, the self-locking mechanism 76 preferably absorbs energy from the hood via a plowing action in which the rolling elements 120 form grooves in the outer tube 84 as they traverse the inner surface 124. Alternatively, in the second mode, the self-locking mechanism 76 locks, enabling energy absorption through accordion buckling of the inner tube 64, with an energy-absorbing member placed in-line with the motor, etc.

Thus, the self-locking mechanism 76 includes an interconnecting element, i.e., shear element 112, that rigidly interconnects the ramp 108 and the retainer 114, provided that the load exerted on the inner tube 64 is below a predetermined amount. When the interconnecting element rigidly interconnects the ramp 108 and the retainer 114, the position of the ramp 108 with respect to the retainer 114 and the rolling elements 120 remains substantially constant, and the rolling elements 120 are positioned not to interfere with translation of the inner tube. When the force exerted on the inner tube exceeds the predetermined amount, the ramp is movable relative to the retainer 114 and the rolling elements 120 so that the ramp exerts a radial force on the rolling elements 120, driving them against the inner surface 124.

Figure 6A:
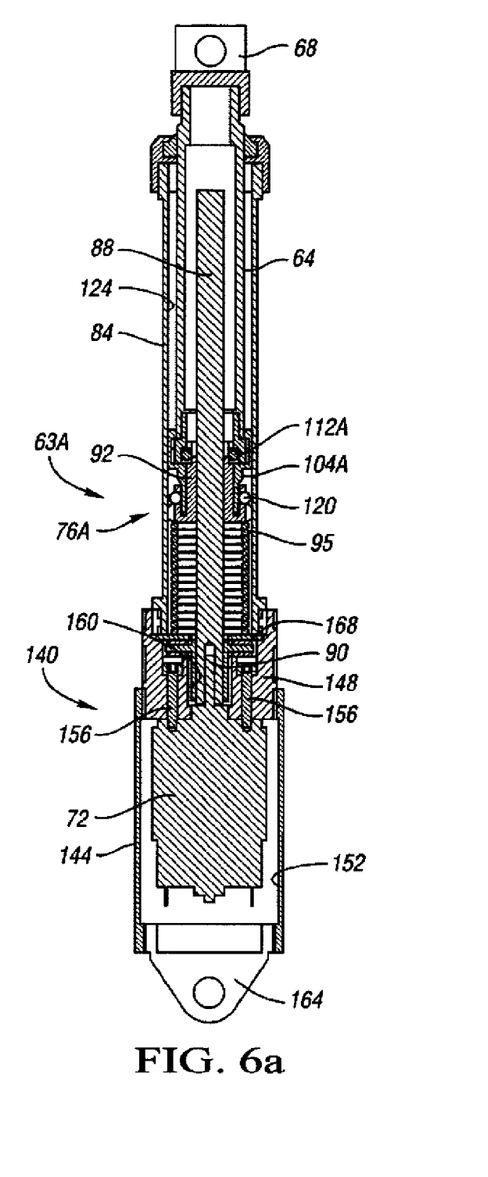
FIG. 6a is a schematic cross-sectional side view of an alternative hood actuator system in a first configuration.

Referring to FIG. 6a, wherein like reference numbers refer to like components from FIGS. 1-5, an alternative hood actuator system 63A is schematically depicted. The hood actuator system 63A includes a support frame 140 that has a cylindrical, tubular member 144 and a motor mount 148. Member 144 is mounted to the motor mount 148 and defines a cylindrical cavity 152 in which the motor 72 is disposed. The motor 72 is mounted to the motor mount 148 by a plurality of fasteners, such as bolts 156 such that the output member 90 of the motor 72 extends through an aperture 160 in the mount 148. Bracket 164 is mounted to member 144, and is pivotably mounted to the vehicle frame, such as the upper mid-rail.

The lead screw 88 also extends through the aperture 160, and is mounted to the output member 90 to be driven thereby. Outer tube 84 is mounted to the motor mount 148 so as to concentrically surround the lead screw 88 and the inner tube 64. The inner tube 64 is mounted to the bracket 68, which in turn is operatively connected to the hood deployment linkage (shown at 54 in FIGS. 1 and 2). The nut 92 is engaged with the lead screw 88, and is operatively connected to the inner tube 64 for movement therewith via the sleeve 104A and shear element 112A. Spring 95 contacts the nut 92 and a member 168 mounted to the motor mount 148.

Figure 6B:
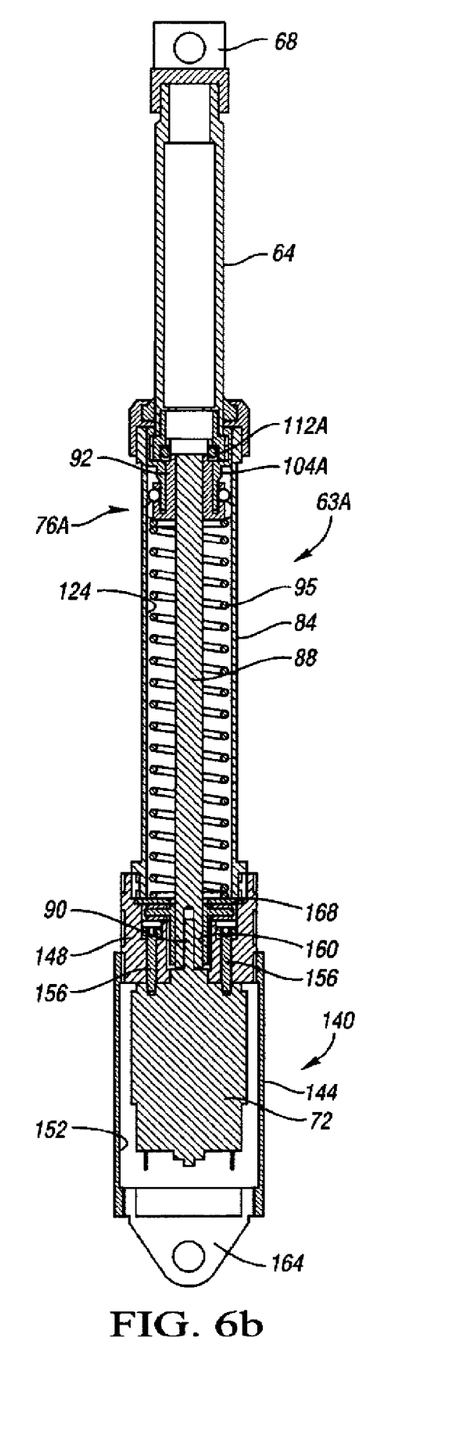
FIG. 6b is a schematic cross-sectional side view of the alternative hood actuator system of FIG. 6a in a second configuration.

The nut 92 and the inner tube 64 are shown in respective retracted positions in FIG. 6a. The nut 92 is operatively connected to the hood (shown at 40 in FIGS. 1 and 2) via the sleeve 104A, the shear element 112A, the inner tube 64, the bracket 68, and the hood deployment linkage (shown at 54 in FIGS. 1 and 2). When the nut 92 is in its retracted position, the hood is in its lowered position. The nut 92 compresses the spring 95 against member 168 such that the spring 95 urges the nut 92 toward an extended position, as shown in FIG. 6b. However, the self locking threads of the lead screw 88 prevent movement of the nut 92 along the lead screw 88 absent rotation of the lead screw 88 by the motor 72. Accordingly, the self-locking threads are sufficient to maintain the nut 92 in its retracted position, and, accordingly, to maintain the hood in its lowered position.

The motor 72 is operable to move the hood to its elevated position by rotating the lead screw 88 in a first direction to cause the nut 92 to move along the screw 88 to its extended position. Referring to FIG. 6b, the spring 95 decompresses as the nut 92 is moved to its extended position, thereby cooperating with the motor 72 such that the motor 72 and the spring 95 concurrently supply energy to the hood via the nut 92 during hood elevation. As the nut 92 moves to its extended position, it exerts a force on the hood via sleeve 104A, the shear element 112A, the inner tube 64, and the bracket 68 to move the hood to its elevated position.

When the hood is in its elevated position, the self-locking mechanism 76A functions similarly to self-locking mechanism 76 to resist downward movement of the hood as a result of a force exerted on the hood, while allowing downward movement of the hood initiated by the motor 72. The hood is retractable to its lowered position by causing the motor 72 to rotate the lead screw 88 in a second direction opposite the first direction so that the nut 92 is returned to its retracted position and the spring 95 is recompressed.

Figure 7A:
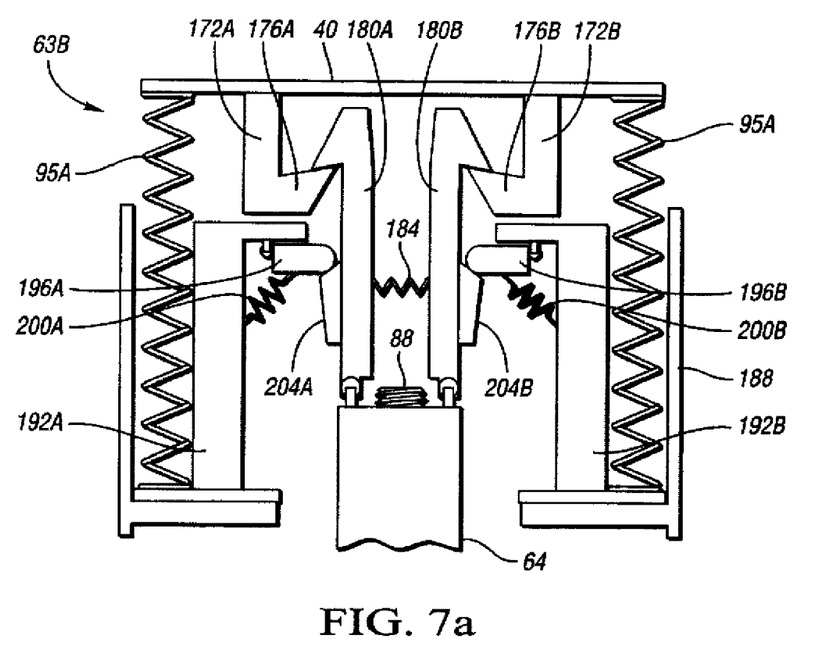
FIG. 7a is a schematic side view of another alternative hood actuator system with the hood in its lowered position.

In the embodiments of FIGS. 1-6b, the nut 92 is continuously operatively connected to the hood 40 throughout the movement of the hood 40 from its lowered position to its elevated position. Accordingly, the motor 72 and the spring 95 simultaneously supply energy to the hood 40 throughout the movement of the hood 40 to its elevated position, and the action of the spring 95 is limited by the self-locking threads 91 acting on the nut 92. FIGS. 7a-7d, wherein like reference numbers refer to like components from FIGS. 1-6b, schematically depict another alternative hood actuator system 63B in which the hood 40 is selectively disconnectable from the nut in order to permit the spring 95 to act on the hood 40 independently of the motor 72. Hood actuator system 63B is substantially similar to the hood actuator system of FIGS. 6a and 6b, except for the placement of the spring and the connection between the hood actuation system 63B and the hood 40. Referring to FIG. 7a, two brackets 172A, 172B are mounted to the hood 40. Each bracket 172A, 172B has a respective hook portion 176A, 176B. Two pawls 180A, 180B are pivotably connected to the inner tube 64, and are biased apart from one another by a spring 184. Springs 95A act on the hood 40 and structure 188. Structure 188 is mounted with respect to the vehicle frame, and may include, for example, the outer tube (shown at 84 in FIGS. 1-6b). Two brackets 192A, 192B are mounted with respect to the structure 188, and pivotably support members 196A, 196B. Springs 200A, 200B bias the members 196A, 196B in the position shown in FIG. 7a.

The hood 40 is shown in its lowered position in FIG. 7a. When the hood 40 is in its lowered position, pawls 180A, 180B engage the hook portions 176A, 176B of brackets 172A, 172B to connect the hood 40 to the inner tube 64 and, therefore, the nut (shown at 92 in FIGS. 3-6b). The springs 95A are compressed and urge the hood upward to its elevated position; however, the hood 40 is prevented from moving to its elevated position because the nut is prevented from moving by the self-locking threads of the lead screw 88 absent initiation by the motor.

Figure 7B:
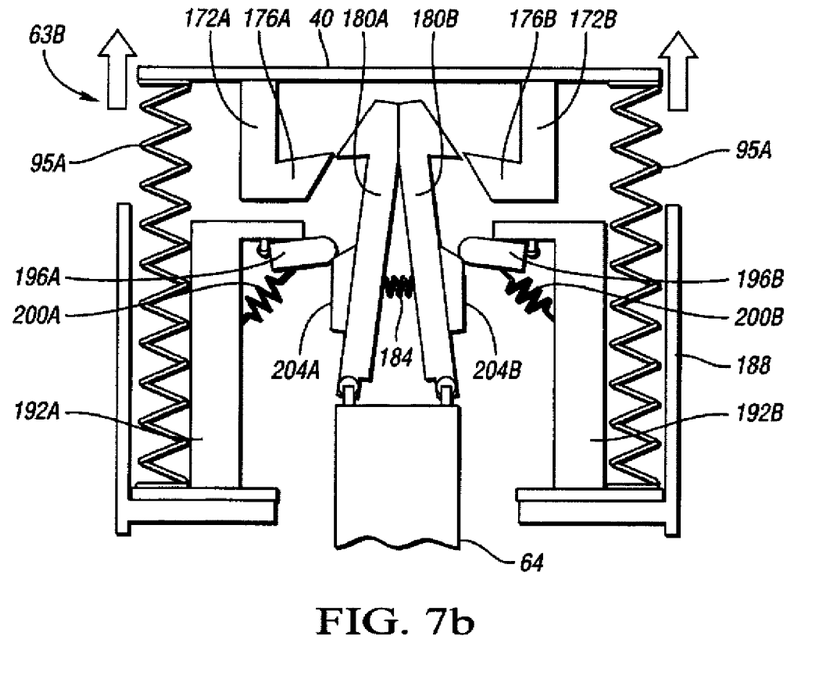
FIG. 7b is a schematic side view of the hood actuator system of FIG. 7a with the hood being raised to its elevated position.
Figure 7C:
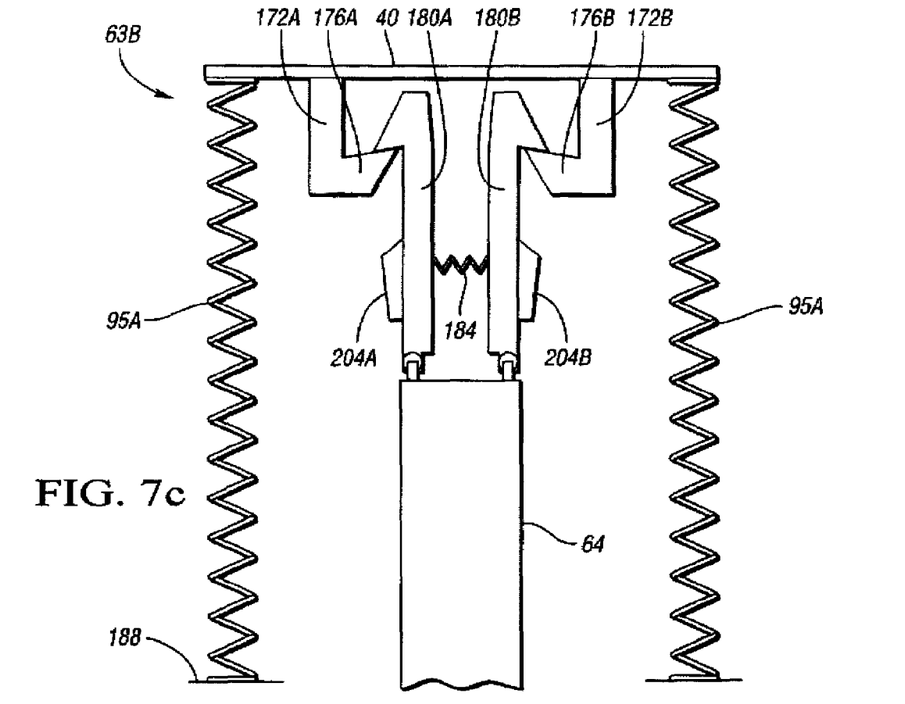
FIG. 7c is a schematic side view of the hood actuator system of FIGS. 7a and 7b with the hood in its elevated position.

Referring to FIG. 7b, when the motor causes the lead screw to rotate in the first direction, the nut is moved toward its extended position, which causes movement of the inner tube 64 and the pawls 180A, 180B toward the hood 40. As the pawls 180A, 180B move relative to the structure 188, protrusions 204A, 204B on the pawls 180A, 180B contact members 196A, 196B, which causes the pawls 180A, 180B to pivot towards each other and out of engagement with hook portions 176A, 176B, thereby decoupling the hood 40 and springs 95A from the nut. Accordingly, without the nut limiting movement of the hood 40, the springs 95A exert force on the hood 40 and thereby cause the hood to move to its elevated position as shown in FIG. 7c. The springs 95A cause the hood 40 to rise faster than the inner tube 64 and pawls 180A, 180B, which are driven by the motor. Accordingly, the pawls are not in the space between the brackets 172A, 172B for much of the hood's movement from the lowered position to the elevated position. It should be noted that the movement of the hood 40 to its elevated position occurs independently of the motor; that is, the hood 40 is decoupled from the motor so that the springs 95A, and not the motor, supply the energy to move the hood 40 throughout most of the hood's travel from the lowered position to the elevated position.

Referring to FIG. 7c, the hood 40 is in its elevated position and the springs 95A are decompressed. The motor continues to rotate the lead screw 88, thereby moving the inner tube 64 and the pawls 180A, 180B upward until the pawls 180A, 180B re-enter the space between the brackets 172A, 172B and re-engage the hook portions 176A, 176B to recouple the nut and motor to the hood 40. With hood 40 recoupled with the inner tube 64, the self-locking mechanism (shown at 76 in FIGS. 1-5) resists downward movement of the hood 40 as a result of a force exerted on the hood 40, while permitting downward movement of the hood 40 that is initiated by the motor.

Figure 7D:
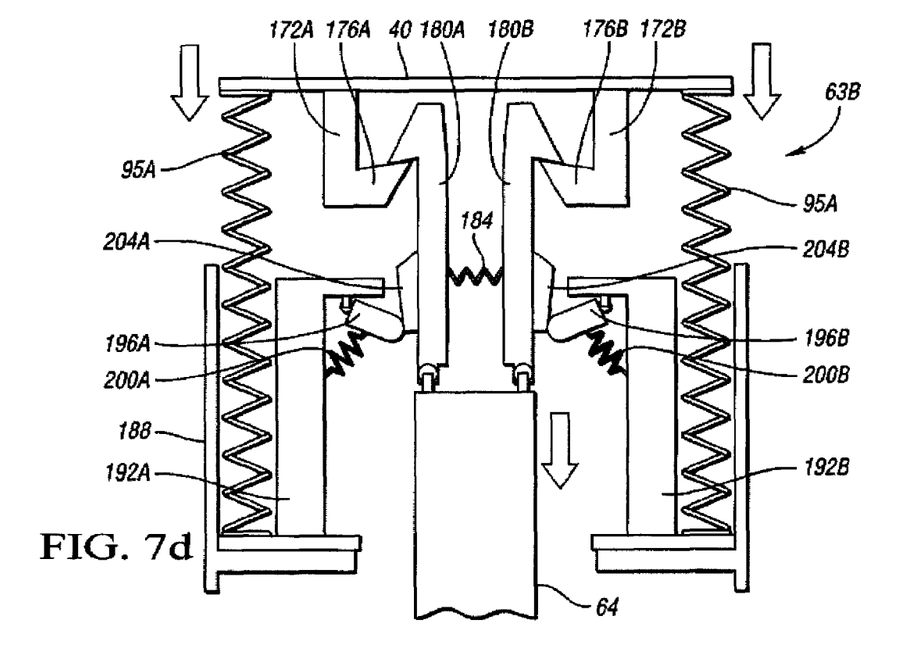
FIG. 7d is a schematic side view of the hood actuator system of FIGS. 7a-7c with the hood being lowered to its lowered position.

Referring to FIG. 7d, the hood 40 is retractable from its elevated position to its lowered position when the motor rotates the lead screw 88 in the second direction. As the inner tube 64 is moved to its retracted position, it draws the hood 40 to its lowered position via the pawls 180A, 180B and the brackets 172A, 172B, and thereby recompresses the springs 95A. The protrusions 204A, 204B contact members 196A, 196B, causing members 196A, 196B to rotate with respect to the structure 188 such that the members 196A, 196B do not cause the pawls 180A, 180B to rotate out of engagement with the hook portions 176A, 176B.

Figure 8:
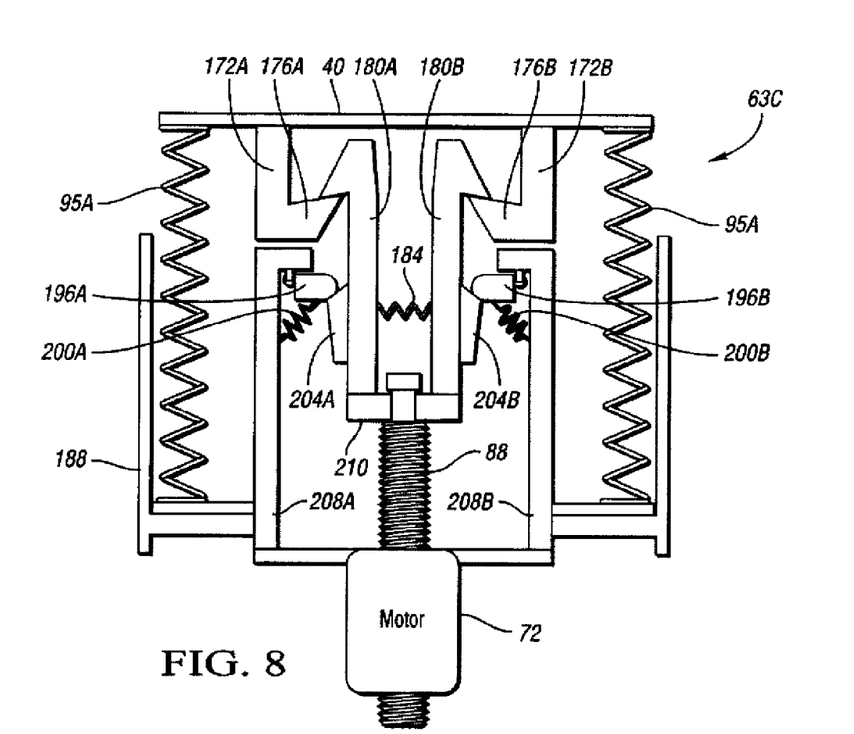
FIG. 8 is a schematic side view of yet another alternative hood actuator system.

Referring to FIG. 8, wherein like reference numbers refer to like components from FIGS. 1-7d, yet another alternative hood actuator system 63C is schematically depicted. Hood actuator system 63B includes two brackets 172A, 172B that are mounted to the hood 40. Each bracket 172A, 172B, has a respective hook portion 176A, 176B. Two pawls 180A, 180B are pivotably connected to member 210, and are biased apart from one another by a spring 184. Springs 95A act on the hood 40 and structure 188. Structure 188 is mounted with respect to the vehicle frame. Two brackets 208A, 208B are mounted with respect to the structure 188, and pivotably support members 196A, 196B. Springs 200A, 200B bias the members 196A, 196B in the position shown in FIG. 8.

Lead screw 88 is rigidly connected to member 210 so that during operation of the motor 72, the lead screw 88 translates up and down rather than rotating. The operation of hood actuator system 63C is similar to the operation of hood actuator system 63B, except that, once the springs 95A elevate the hood 40 to its elevated position, the motor 72 stops operating, and the springs 95A act alone to absorb energy from the hood 40.

Figure 9:
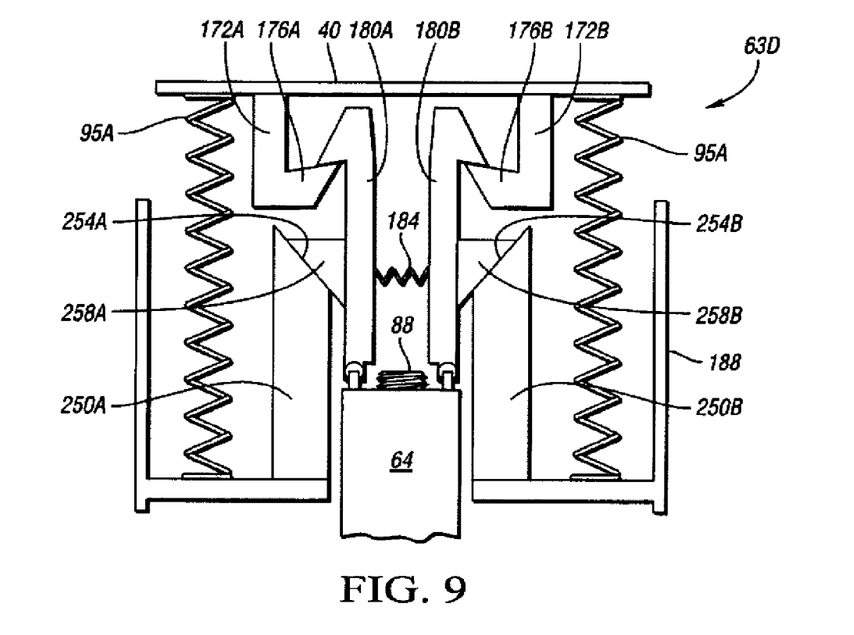
FIG. 9 is a schematic side view of yet another alternative hood actuator system.

Referring to FIG. 9, wherein like reference numbers refer to like components from FIGS. 1-8, yet another hood actuator system 63D is schematically depicted. Two brackets 172A, 172B are mounted to the hood 40. Each bracket 172A, 172B, has a respective hook portion 176A, 176B. Two pawls 180A, 180B are pivotably connected to the inner tube 64, and are biased apart from one another by a spring 184. Springs 95A act on the hood 40 and structure 188. Structure 188 is mounted with respect to the vehicle frame, and may include, for example, the outer tube (shown at 84 in FIGS. 1-6b). Two members 250A, 250B are mounted to the structure 188, and are characterized by inclined surfaces 254A, 254B.

To elevate the hood 40, the motor rotates the lead screw 88 in the second direction to cause the inner tube 64 and the pawls 180A, 180B to move downward. The interaction between protrusions 258A, 258B on the pawls 180A, 180B and the surfaces 254A, 254B causes the pawls 180A, 180B to rotate out of engagement with the brackets 172A, 172B, thereby permitting the springs 95A to force the hood 40 to its elevated position. The motor can then rotate the lead screw 88 in the first direction until the pawls 180A, 180B reengage the brackets 172A, 172B to recouple the hood 40 and the nut.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a hood configured to extend above and over a front compartment and being selectively movable between an elevated position and a lowered position;
   a hood actuator configured to selectively move the hood between its lowered and elevated positions, the hood actuator including a spring and a motor;
   said spring biasing the hood toward its elevated position when the hood is in its lowered position; and
   said motor being operatively connected to the hood and configured to selectively cause the hood to move from its elevated position to its lowered position and thereby compress the spring.

2. The vehicle of claim 1, wherein the hood actuator is configured such that the spring and the motor concurrently supply energy to move the hood from its lowered position to its elevated position.

3. The vehicle of claim 2, wherein the motor includes a rotatable output member; wherein the vehicle further comprises a selectively rotatable shaft that is characterized by self-locking threads and that is operatively connected to the output member to receive torque therefrom; a nut being engaged with said shaft such that rotation of the shaft causes movement of the nut along the shaft; wherein said nut is operatively connected to the hood such that movement of the nut along the shaft causes the hood to move between its elevated and lowered positions.

4. The vehicle of claim 1, wherein the hood actuator is configured such that the spring and not the motor supplies energy to the hood during at least part of the hood's travel from its lowered position to its elevated position.

5. The vehicle of claim 4, further comprising a locking mechanism operatively connected to the hood and sufficiently configured to resist downward movement of the hood caused by a force exerted on the hood during a vehicle impact while allowing downward movement of the hood initiated by the motor.

6. The vehicle of claim 1, further comprising at least one controller; and at least one sensor configured to monitor at least one vehicle condition and transmit sensor signals indicative of said at least one vehicle condition to said at least one controller;
   wherein said at least one controller is configured to determine whether the sensor signals indicate the presence of said at least one predetermined vehicle condition and to cause the actuator to raise at least a portion of the hood in response to the sensor signals indicating the presence of said at least one predetermined vehicle condition.

7. A vehicle comprising:
   a hood configured to extend above and over a front compartment and being selectively movable between an elevated position and a lowered position;
   a hood actuator being operatively connected to the hood to selectively move the hood between its elevated and lowered positions, said hood actuator having a shaft, a motor, a nut, and a spring;
   said shaft being characterized by self-locking threads;
   said motor having an output member operatively connected to the shaft and configured to selectively rotate the shaft in first and second directions;
   said nut being engaged with the shaft such that rotation of the shaft causes the nut to move along the shaft;
   said spring biasing the hood toward its elevated position when the hood is in its lowered position.

8. The vehicle of claim 7, wherein the hood actuator is configured such that the nut is continuously operatively connected to the hood as the hood moves from its lowered position to its elevated position.

9. The vehicle of claim 7, wherein the hood actuator is configured such that the nut is operatively disconnected from the hood for at least part of the hood's movement from its lowered position to its extended position such that the spring and not the motor supplies energy to move the hood.

10. The vehicle of claim 7, further comprising a locking mechanism operatively connected to the hood and sufficiently configured to resist downward movement of the hood caused by a force exerted on the hood during a vehicle impact while allowing downward movement of the hood initiated by the motor.

11. A vehicle comprising:
    a hood configured to extend above and over a front compartment and being selectively movable between an elevated position and a lowered position;
    a support member operatively connected to the hood;
    a motor operatively connected to the support member and configured to selectively move the hood between its elevated position and its lowered position by extending and retracting the support member;
    a spring biasing the hood toward its elevated position when the hood is in its lowered position;
    a locking mechanism operatively interconnecting the support member to the motor and including
      an outer tube characterized by an inner surface,
      an inner member operatively connected to the support member and supported within the outer tube for translation in an extension direction in which the support member is extended and in a retraction direction in which the support member is retracted, a ramp on the inner member facing the inside surface of the outer tube, the distance between the ramp and the inside surface of the outer tube being greater at a first end of the ramp than at a second end of the ramp, a rolling element between the ramp and the inside surface of the outer tube, and a retainer member configured to at least partially extend between the roller element and the second end of the ramp during movement of the support member caused by the actuator to restrict relative movement of the roller element and the ramp and thereby prevent the roller element from wedgingly engaging the inside surface of the outer tube; and wherein the locking mechanism is configured so that movement of the inner member in the retraction direction caused by a force exerted on the hood results in relative movement between the ramp and the retainer member whereby the ramp drives the roller element into wedging engagement with the inside surface.

* * * * *